United States Patent
Wang et al.

(10) Patent No.: US 12,469,139 B2
(45) Date of Patent: Nov. 11, 2025

(54) METHOD FOR DETECT TISSUE HEMORRHAGE WITH IMAGE ANALYSIS

(71) Applicant: NATIONAL CHUNG CHENG UNIVERSITY, Chiayi County (TW)

(72) Inventors: Hsiang-Chen Wang, Chiayi (TW); Yu-Ming Tsao, Chiayi County (TW); Bing-Hsuan Liang, Chiayi County (TW)

(73) Assignee: National Chung Cheng University, Chiayi County (TW)

( * ) Notice: Subject to any disclaimer, the term of this patent is extended or adjusted under 35 U.S.C. 154(b) by 300 days.

(21) Appl. No.: 18/355,597

(22) Filed: Jul. 20, 2023

(65) Prior Publication Data

US 2024/0362785 A1  Oct. 31, 2024

(30) Foreign Application Priority Data

Apr. 26, 2023 (TW) .................. 112115640

(51) Int. Cl.
*G06T 7/00* (2017.01)
*A61B 5/02* (2006.01)
(Continued)

(52) U.S. Cl.
CPC ........ *G06T 7/0014* (2013.01); *A61B 5/02042* (2013.01); *G06T 7/90* (2017.01);
(Continued)

(58) Field of Classification Search
CPC .................... G06T 7/0014; G06T 7/90; G06T 2207/10024; G06T 2207/10068;
(Continued)

(56) References Cited

U.S. PATENT DOCUMENTS 11,200,670 B2 * 12/2021 Maetschke ................ G06T 7/70
11,737,644 B2 *  8/2023 Spector .............. A61B 1/00087
                                                            600/407

(Continued)

Primary Examiner — Michael S Osinski
(74) Attorney, Agent, or Firm — Rosenberg, Klein & Lee

(57) ABSTRACT

The present invention provides a method for detecting tissue hemorrhage with image analysis. A host produces a plurality of hyperspectral image information according to a plurality of reference images. An image extraction unit extracts an input image to the host. The host transforms the input image according to the plurality of hyperspectral image information to produce a hyperspectral input image. The host produces an input image spectrum according to the hyperspectral input image. The host performs a feature operation on the input image spectrum according to a preset cell band corresponding to a surface cell of small intestine for generating a plurality of corresponding feature bands. The host performs at least one convolution operation on the plurality of feature bands according to a plurality of kernels for producing a convolution result. The host matches and compares the convolution result with at least one hyperspectral sample band of at least one hyperspectral sample spectrum of at least one hyperspectral sample image for producing at least one comparison result. Finally the host judges if hemorrhage occurs on the surface layer of small intestine according to the comparison result.

10 Claims, 14 Drawing Sheets

(51) Int. Cl.
*G06T 7/90* (2017.01)
*G16H 30/40* (2018.01)

(52) U.S. Cl.
CPC ... *G16H 30/40* (2018.01); *G06T 2207/10024* (2013.01); *G06T 2207/10068* (2013.01); *G06T 2207/20081* (2013.01); *G06T 2207/20084* (2013.01); *G06T 2207/30092* (2013.01); *G06T 2207/30096* (2013.01); *G06T 2207/30104* (2013.01)

(58) Field of Classification Search
CPC . G06T 2207/20081; G06T 2207/20084; G06T 2207/30092; G06T 2207/30096; G06T 2207/30104; G06T 7/0012; G06T 2207/10081; G06T 2207/30024; G06T 2207/30041; G06T 2207/10056; G06T 2207/10088; G06T 2207/30016; A61B 5/02042; A61B 5/0075; A61B 1/0005; A61B 1/00009; A61B 1/00055; A61B 3/12; A61B 5/0084; G16H 30/40; G16H 50/20; G16H 30/20; G16H 50/70
See application file for complete search history.

(56) References Cited

U.S. PATENT DOCUMENTS

| | | | | |
|---|---|---|---|---|
| 11,750,782 | B2* | 9/2023 | Sidar | A61B 1/000095 |
| | | | | 348/71 |
| 11,802,985 | B2* | 10/2023 | Tian | G01V 1/306 |
| 11,969,145 | B2* | 4/2024 | Zhang | A61B 1/0005 |
| 12,008,757 | B2* | 6/2024 | Karki | G06T 7/0014 |
| 2007/0015989 | A1* | 1/2007 | Desai | A61B 5/0084 |
| | | | | 600/407 |
| 2017/0076442 | A1* | 3/2017 | Schoenmeyer | G06T 7/11 |
| 2019/0137339 | A1* | 5/2019 | Olson | G01J 1/08 |
| 2021/0201514 | A1* | 7/2021 | Sylvestre | G06T 7/97 |
| 2022/0336084 | A1* | 10/2022 | Ironside | G06T 7/0014 |
| 2023/0103262 | A1* | 3/2023 | Zhang | G06F 18/214 |
| | | | | 382/155 |
| 2023/0306720 | A1* | 9/2023 | Wang | G06V 40/193 |
| 2024/0153088 | A1* | 5/2024 | Danjo | G06T 7/0014 |
| 2024/0355463 | A1* | 10/2024 | Mansi | G06T 7/0012 |
| 2024/0419948 | A1* | 12/2024 | Gilbert | G06N 3/045 |

* cited by examiner

METHOD FOR DETECT TISSUE HEMORRHAGE WITH IMAGE ANALYSIS

BACKGROUND OF THE INVENTION

The small intestine is formed by the duodenum, the jejunum, and the ileum with an average length of six to seven meters and is the longest segment of the digestive canal. It extends from the back of the stomach to the large intestine and is the major organ for digestion and absorption of food.

Due to the different degrees of muscle tension, the length of the small intestine in adults is between 6 and 7 meters. While in normal people, the length of the small intestine is between 3 and 4 meters due to muscle contraction. The length of the duodenum is about the sum of the widths of 12 fingers (about 24 cm). The jejunum accounts for about 40% of the total length of the small intestine, and the ileum accounts for about 60%. Although the incidence of small intestinal diseases is relatively low, sometimes general endoscopy and colonoscopy cannot diagnose unexplained abdominal pain, which may be a problem with the small intestine. It usually takes some time to diagnose, leading to delay in treatment. Once small bowel disease occurs, it is a big challenge for patients and clinicians, both in diagnosis and treatment.

The digestive tract includes the esophagus, stomach, small intestine (including duodenum, jejunum, and ileum) and large intestine. Due to the advancement of endoscopic instruments and techniques, endoscopy has become an important tool for the diagnosis and treatment of gastrointestinal diseases.

However, small bowel disease is still the most difficult problem, because it is about 4 to 6 meters long and is located deep in the gastrointestinal tract. General endoscopy cannot reach the small intestine, so the diagnosis and treatment of small bowel disease is still very difficult. The traditional push-type enteroscopy is the most commonly used endoscope for the diagnosis of small bowel diseases, but it can only reach the proximal end of the jejunum. In recent years, due to the advent of tools for examining the small intestine, we have the opportunity to examine the entire small intestine completely. The most commonly used of these are capsule enteroscopy and balloon-assisted enteroscopy.

The technology of double-balloon enteroscopy was proposed by Professor Hironori Yamamoto of Japan in 2001.

The traditional push-type enteroscope is only a 200 cm endoscope, but the double balloon enteroscope is composed of a 200 cm endoscope and a 145 cm overtube with each having a balloon at the front end. In addition, there is a pump that controls the inflation or deflation of the balloon and monitors the air pressure. Its method is similar to that of a general gastroscope or colonoscope. First, it must be inserted through the mouth or anus, depending on where the lesion is closer according to the clinical judgment. The traditional push-type enteroscope often stretches the small intestine and makes the patient uncomfortable during insertion, so it cannot reach the deep part of the small intestine. On the other hand, the double-balloon enteroscope uses two balloons to inflate the small intestine alternately to support the small intestine, and slowly invaginates the small intestine to shorten the intestine and simplify the shape of the intestine, which can more effectively use the length of the endoscope and achieve a deeper penetration than the traditional enteroscope. Professor Hiroshi Yamamoto's research pointed out that, regardless of whether it is inserted through the mouth or anus, most of the double-balloon enteroscopy can observe the length of one-half to two-thirds of the total length of the small intestine. If the two are combined, the entire small intestine can be observed for 86% of patients. Even in few cases, the entire small intestine can be viewed by inserting a 200 cm endoscope through the mouth. In addition, like ordinary endoscopes, there is also a tube attached to the enteroscope, through which slice clips or other treatment instruments can be placed to treat the lesion. Moreover, there is also a single-balloon enteroscope at present. Like the double-balloon enteroscope, the single-balloon enteroscope is also composed of a 200 cm endoscope and a 145 cm overtube, but the difference is that only the overtube has a balloon at the front end. There is no balloon at the front end of the endoscope. Its method is the same as that of the double-balloon enteroscope, except that in the process of intussusception to shorten the small intestine, the flexible part at the front end of the endoscope replaces the balloon at the front end of the double-balloon enteroscope to support the small intestine.

The risk of balloon enteroscopy is the same as that of general endoscopy, but the biggest limitation of balloon enteroscopy is that it takes a long time, about 1-2 hours. Especially, when it is inserted through the mouth, the patient will feel uncomfortable, so it is necessary to have mild anesthesia. The risk will be relatively increased in patients with poor cardiopulmonary function. Pregnant women are not recommended to undergo this test either.

Endoscopy is still the most effective diagnostic tool for the detection of gastrointestinal diseases. However, traditional endoscopy still has its clinical shortcomings. The endoscopic hose and equipment are inserted deep into the gastrointestinal tract, and the whole process is time-consuming and causes discomfort to patients. Thereby, capsule endoscopy should be considered as the foremost procedure for bowel examination.

Capsule endoscopy was invented by Dr. Gavriel Iddan of Israel in 1999, and it was certified by the US Food and Drug Administration in August 2001 and approved for marketing. It is a device the size of a capsule (approximately 26×11 mm) with a camera, image-sensing transmitter, and a delicate battery at the front. After the patient swallows it like a pill, it records and transmits images as it moves through the intestinal tract. In the recorder carried outside the body, images can be recorded for 8 hours. Generally speaking, images of the entire small intestine can be recorded. After the images are collected, experts will interpret the images and find out the abnormalities.

Gastrointestinal hemorrhage detection is crucial for wireless capsule endoscopy (WCE) because hemorrhage is not only the most common abnormality of the GI tract but also an important symptom or syndrome of other GI lesions such as ulcers, polyps, tumors, and Crohn's disease. Gastrointestinal hemorrhage can be further divided into active hemorrhage (i.e. evidence of ongoing hemorrhage) and inactive hemorrhage and can occur anywhere throughout the GI tract.

However, at present, gastrointestinal hemorrhage detection is mainly done by doctors looking at the entire wireless capsule endoscope images, which is an extremely laborious and time-consuming process. Although it has been accelerated by 20 times in the image capture device of the capsule endoscope, it is still a troublesome thing for doctors to find the lesion while watching the video, and there is a possibility that they cannot find the hemorrhage spots. Therefore, using image recognition to automatically find the part with hemorrhage can assist the doctor to inspect more easily and quickly. Accordingly, it is a challenge for those skilled in the art to establish a model of using image recognition to identify hemorrhage in endoscopic images of the small intestine.

SUMMARY OF THE INVENTION

An objective of the present invention is to provide a method for detecting tissue hemorrhage with image analysis. By using the convolutional neural network, the features will be calculated. Then select a specific band. Match and compare the convolutional result with the spectrum of hyperspectral sample images. Whether hemorrhage occurs on the surface layer of small intestine can be further judged, which facilitates medical staffs to judge diseases rapidly.

To achieve the above objective, the present invention provides a method for detecting tissue hemorrhage with image analysis, which comprises steps of: producing a plurality of hyperspectral image information by a host according to a plurality of reference images; extracting an input image to said host by an image extraction unit; transforming said input image by said host according to said plurality of hyperspectral image information to produce a hyperspectral input image; producing an input image spectrum by said host according to said hyperspectral input image; performing a feature operation on said input image spectrum by said host according to a preset cell band corresponding to a surface cell of a small intestine for generating a plurality of corresponding feature bands; performing at least one convolution operation on said plurality of feature bands by said host according to a plurality of kernels for producing a convolution result; matching and comparing said convolution result with at least one hyperspectral sample band of at least one hyperspectral sample spectrum of at least one hyperspectral sample image by said host for producing at least one comparison result; and judging said input image to be a hemorrhage image on the surface layer of said small intestine when said at least one comparison result shows equality between said convolution result and said hyperspectral sample band. Thereby, whether hemorrhage occurs on the surface layer of said small intestine can be judged according to enteroscopic images only. It is no longer required for medical staffs to observe the whole enteroscopic images. While reducing the burden, medical staffs can further provide patients with correct medical interventions.

According to an embodiment of the present invention, wherein said step of producing a plurality of hyperspectral image information by a host according to a plurality of reference images: producing and transmitting a plurality of reference image spectra of said plurality of reference images to said host by a spectrometer; and performing a principal component analysis on said plurality of reference image spectra and producing said hyperspectral image information by said host.

According to an embodiment of the present invention, wherein said step of performing at least one convolution operation on said plurality of feature bands by said host according to a plurality of kernels for producing a convolution result includes steps of: performing at least one convolution layer operation by said host on said plurality of feature bands for producing at least one feature map; performing a pooling layer operation by said host on said at least one feature map for reducing the size of said at least one feature map; and performing a fully connected layer operation by said host on said at least one feature map, training said at least one feature map and producing a weight and said convolution result.

According to an embodiment of the present invention, the hyperspectral image information includes a plurality of white-light images corresponding to the input image, a plurality of color matching functions, a calibration matrix, and a transformation matrix.

According to an embodiment of the present invention, the transformation method of the host transforming the hyperspectral input image to an input image spectrum is using a spectrometer to transform the hyperspectral input image to the input image spectrum.

According to an embodiment of the present invention, wherein said step of producing an input image spectrum by said host according to said hyperspectral input image includes steps of:
transmitting said hyperspectral input image to a spectrometer by said host; and producing and transmitting said input image spectrum to said host by said spectrometer according to said hyperspectral input image.

According to an embodiment of the present invention, wherein said step of matching and comparing said convolution result with at least one hyperspectral sample band of at least one hyperspectral sample spectrum of at least one hyperspectral sample image by said host for producing at least one comparison result, reads said at least one hyperspectral sample band of said at least one hyperspectral sample spectrum of said at least one hyperspectral sample image from a database for matching and comparing said input image according to said convolution result by said host.

According to an embodiment of the present invention, wherein said at least one hyperspectral sample spectrum of said at least one hyperspectral sample image includes at least one hemorrhage spectrum of at least one hemorrhage image of the surface layer of said small intestine.

According to an embodiment of the present invention, wherein said feature band corresponding to said preset cell band and said plurality of hyperspectral sample band is between 405 nanometers to 415 nanometers.

According to an embodiment of the present invention, wherein said plurality of reference images are a plurality of white-light images or a plurality of narrow-band images of a plurality of surface cells of a digestive tract.

DETAILED DESCRIPTION OF THE INVENTION

In order to make the structure and characteristics as well as the effectiveness of the present invention to be further understood and recognized, the detailed description of the present invention is provided as follows along with embodiments and accompanying figures.

In view of the fact that the observation of small intestine lesions is mainly performed by capsule endoscopy, medical personnel need to view the entire wireless capsule endoscopy images. Although the image capture device of the capsule endoscopy has been accelerated by 20 times, it is still a tedious task for medical staff to find lesions by checking the images. The present invention provides a method for detecting tissue hemorrhage with image analysis for solving the bothersome problem of finding the hemorrhage spots of the endoscopic images by medical staffs.

In the following, the properties and the accompanying system of the method for detecting tissue hemorrhage with image analysis discloses by the present invention will be further illustrated.

Figure 1:
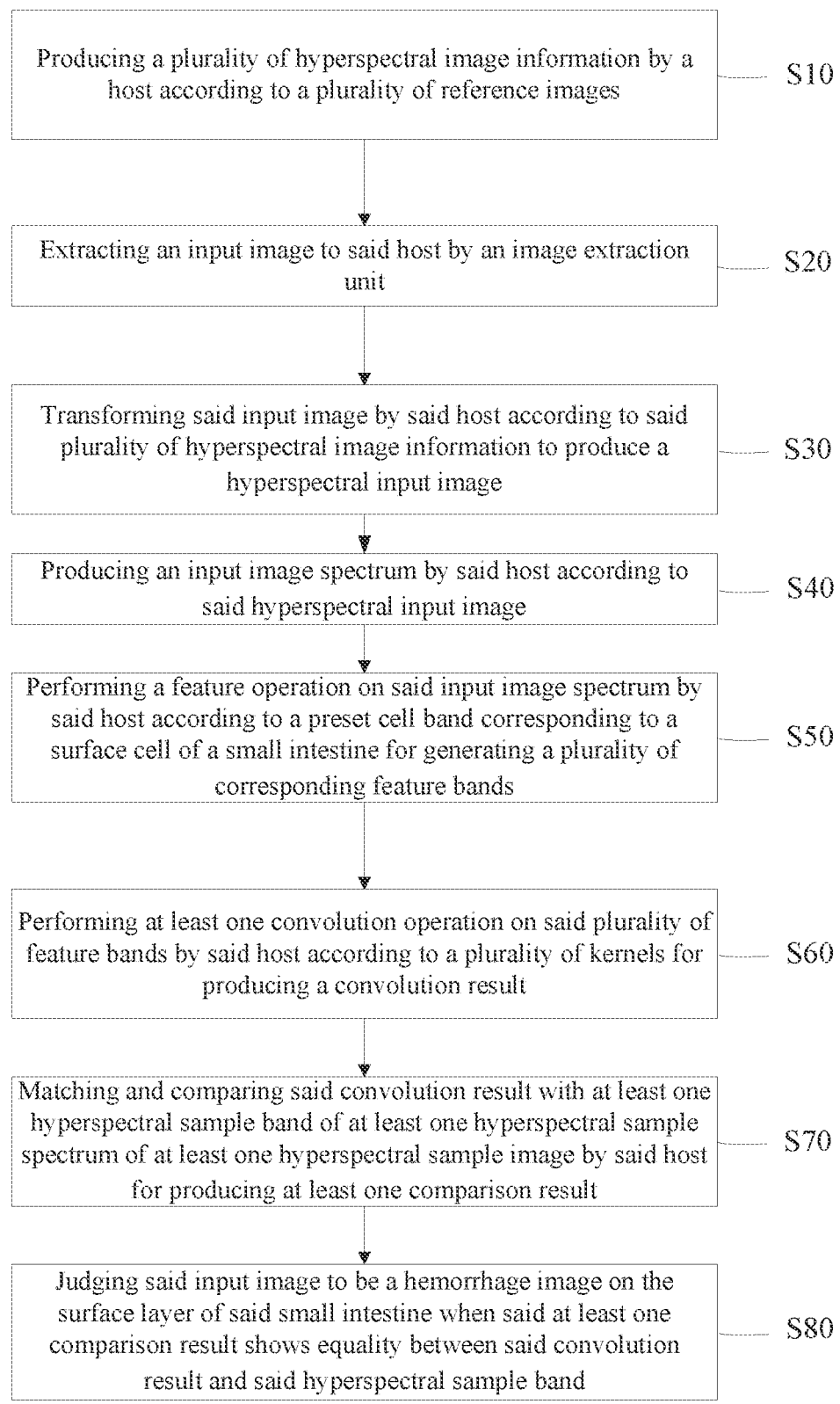
FIG. 1 shows a flowchart of the method according to an embodiment of the present invention.

First, please refer to FIG. 1, which shows a flowchart of the method according to an embodiment of the present invention. As shown in figure, the method for detecting tissue hemorrhage with image analysis according to the present invention comprises steps of:

Step S10: Producing a plurality of hyperspectral image information by a host according to a plurality of reference images;

Step S20: Extracting an input image to said host by an image extraction unit;

Step S30: Transforming said input image by said host according to said plurality of hyperspectral image information to produce a hyperspectral input image;

Step S40: Producing an input image spectrum by said host according to said hyperspectral input image;

Step S50: Performing a feature operation on said input image spectrum by said host according to a preset cell band corresponding to a surface cell of small intestine for generating a plurality of corresponding feature bands;

Step S60: Performing at least one convolution operation on said plurality of feature bands by said host according to a plurality of kernels for producing a convolution result;

Step S70: Matching and comparing said convolution result with at least one hyperspectral sample band of at least one hyperspectral sample spectrum of at least one hyperspectral sample image by said host for producing at least one comparison result; and Step S80: Judging said input image to be a hemorrhage image on the surface layer of small intestine when said at least one comparison result shows equality between said convolution result and said hyperspectral sample band.

Figure 2:
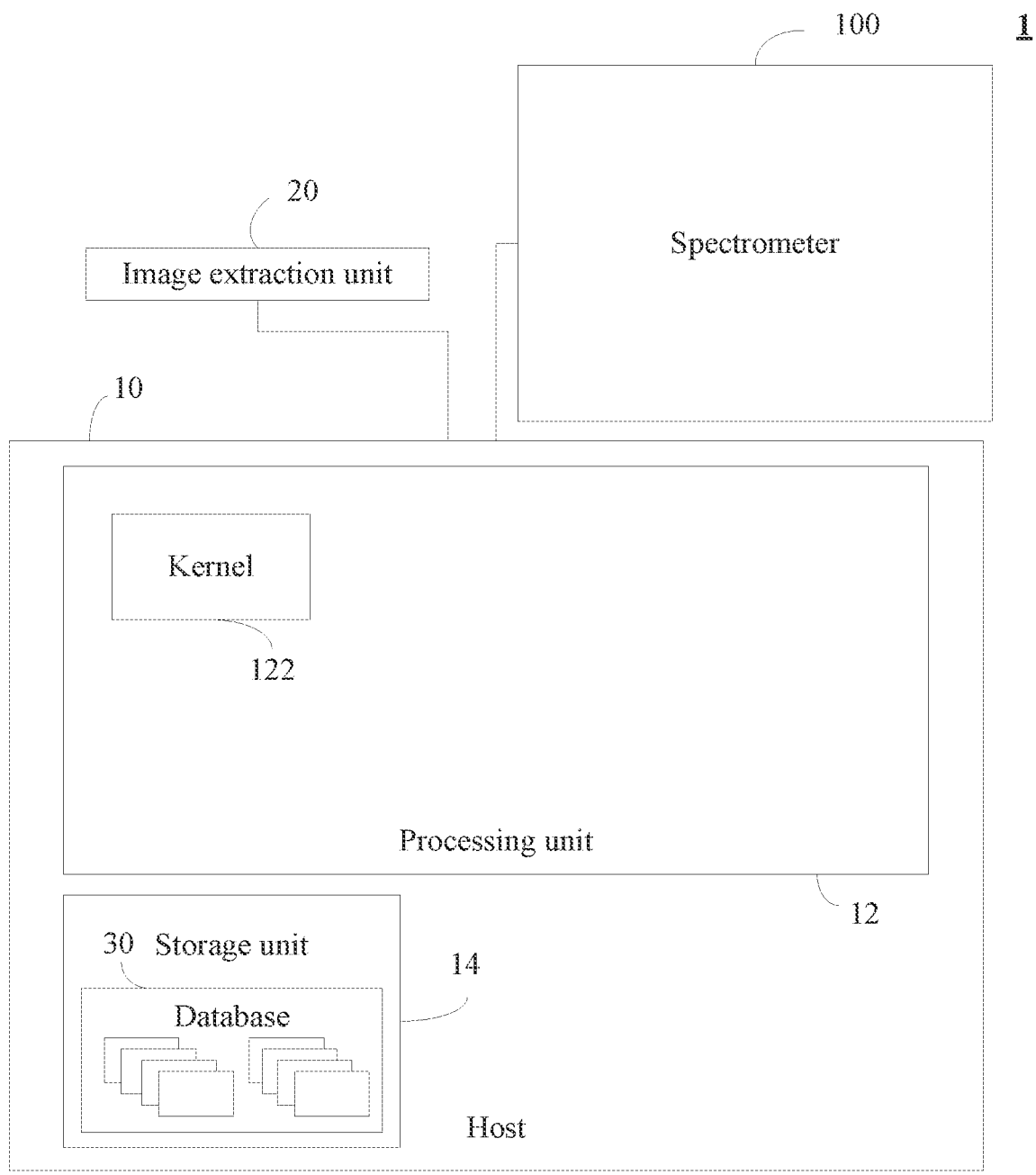
FIG. 2 shows a block diagram of the method according to an embodiment of the present invention.

Please refer to FIG. 2, which shows an analysis system 1 for realizing the method for detecting tissue hemorrhage with image analysis according to the present invention. Said analysis system 1 comprises a host 1, an image extraction unit 20, and a spectrometer 100. According to the present embodiment, said host 10 is a computer host including a processing unit 12 and a storage unit 14. Nonetheless, the present invention is not limited to the embodiment. Said host 10 can be a server, a notebook computer, a tablet computer, or ant electronic device equipped with computation capability. A database 30 is built in the storage unit 14. Alternatively, said database 30 can be built in an external storage unit. Said processing unit 12 includes a plurality of kernels 122. In addition, according to the present embodiment, Said image extraction unit 20 is a capsule enteroscope for detecting organs and tissues inside human body. Nonetheless, said image extraction unit 20 is not limited to a capsule enteroscope; an invasive enteroscope and various image extraction device will be applicable.

Next, the above steps will be described in detail.

Figure 3:
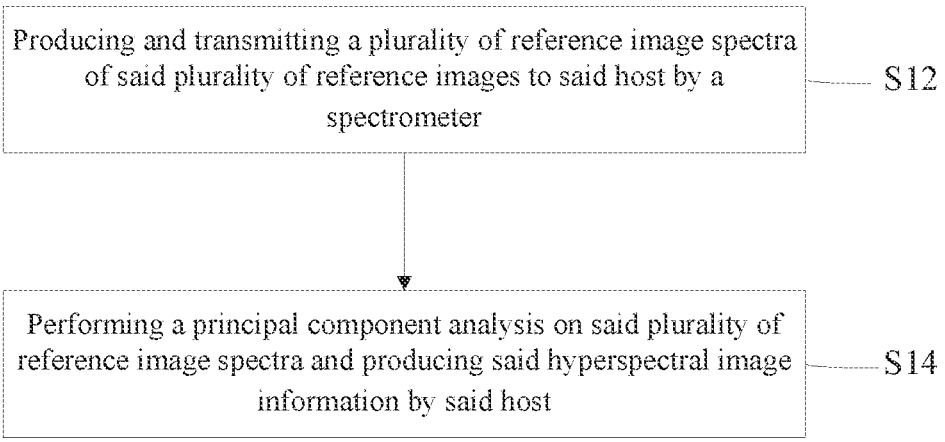
FIG. 3 shows a flowchart of the method according to an embodiment of the present invention.

In the step S10, as shown in FIG. 3, the step of said host 10 producing a plurality of hyperspectral image information 42 according to a plurality of reference images 40 further includes steps S12 and S14, as illustrated in the following:

Step S12: Producing and transmitting a plurality of reference image spectra of said plurality of reference images to said host by a spectrometer; and Step S14: Performing a principal component analysis on said plurality of reference image spectra and producing said hyperspectral image information by said host.

Figure 4A:
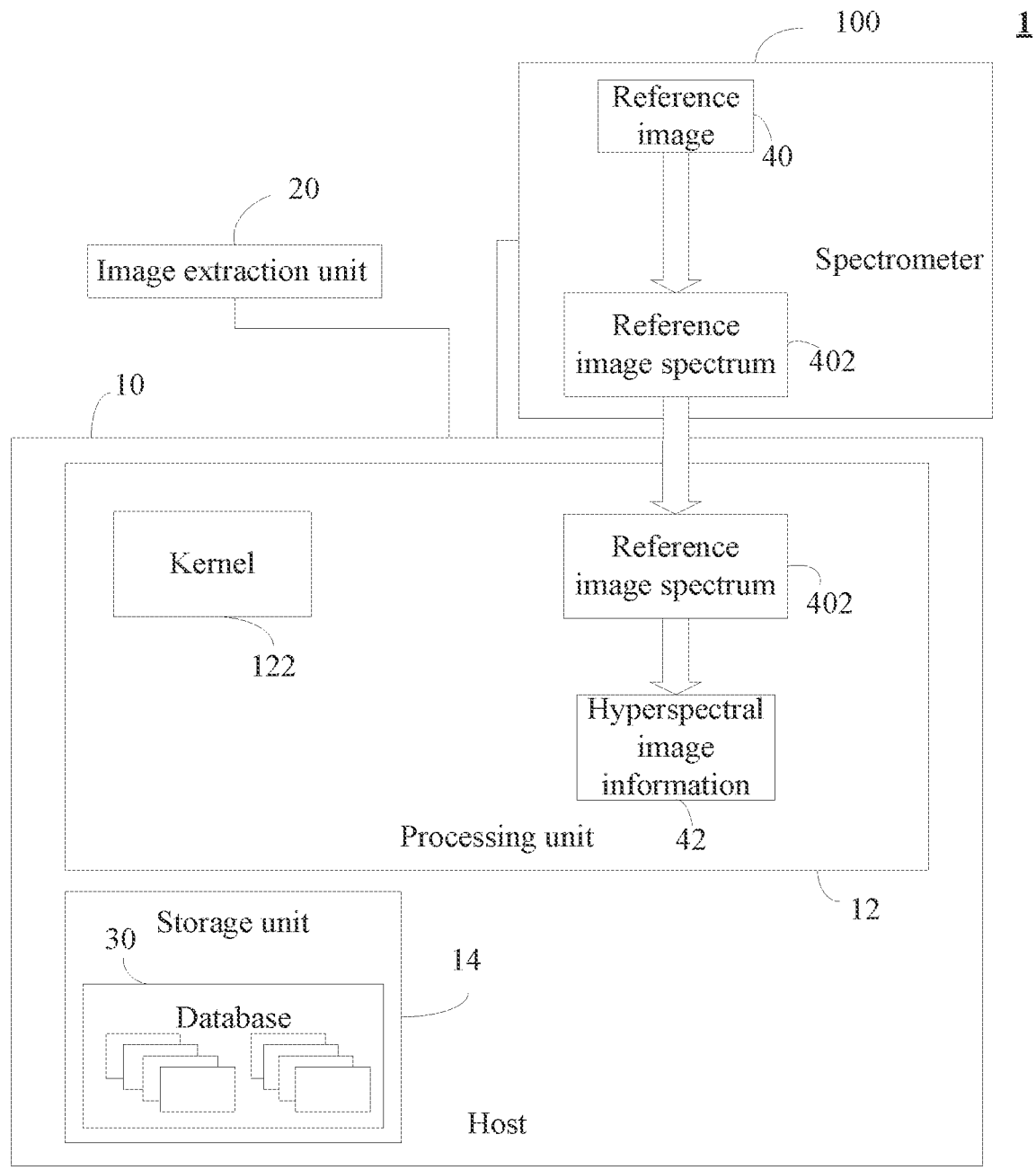
FIGS. 4A to 4B show block diagrams of the method according to an embodiment of the present invention.

In the step S12, as shown in FIG. 4A, said spectrometer 10 produces and transmits a plurality of reference image spectra 402 of said plurality of reference images 40 to said host 10. Said plurality of reference images 40 can be the white-light images stored in said database 30 or the reference color checkers extracted from the X-Rite Classic, 24 color checkers by said extraction unit 20. According to the present embodiment, said image extraction unit 20 uses the capsule enteroscope PillCam™ SB 3 Capsule to acquire said corresponding plurality of reference images 40 of the white light.

In the step S14, as shown in FIG. 4A, said host 10 performs a principal component analysis on said plurality of reference image spectra 402 and produces said plurality of hyperspectral image information 42. In other words, a general image color space (the color space of the extracted images) is transformed to the XYZ color space (CIE 1931 XYZ color space), for example, transforming from the sRGB color space to the XYZ color space. Said plurality of hyperspectral image information 42 according to the present invention correspond to the X-Rite Classic, 24 color checkers, which include the main colors (red, green, blue, gray) generally seen in the nature. Said plurality of hyperspectral image information 42 correspond to the white-light images as described above and include a plurality of color matching functions (CMF), a calibration matrix C, and a transformation matrix M. Said spectrometer 100 according to the present embodiment is Ocean Optics-QE65000 used for producing said plurality of reference image spectra 402 corresponding to said plurality of reference images 40.

To transform, the first step is to transform said plurality of reference images 40 and said spectrometer 100 Ocean Optics-QE65000 to the same XYZ color space. The transformation formula for said plurality of reference images 40 is:

$$\begin{bmatrix} X \\ Y \\ Z \end{bmatrix} = [M_A][T] \begin{bmatrix} f(R_{sRGB}) \\ f(G_{sRGB}) \\ f(B_{sRGB}) \end{bmatrix} \times 100, 0 \le \begin{matrix} R_{sRGB} \\ G_{sRGB} \\ B_{sRGB} \end{matrix} \le 1 \quad \text{Eq. (1)}$$

where

-continued $$[T] = \begin{bmatrix} 0.4104 & 0.3576 & 0.1805 \\ 0.2126 & 0.7152 & 0.0722 \\ 0.0193 & 0.1192 & 0.9505 \end{bmatrix} \quad \text{Eq. (2)}$$

$$f(n) = \begin{cases} \left(\dfrac{n+0.055}{1.055}\right)^{2.4}, & n > 0.04045 \\ \left(\dfrac{n}{12.92}\right), & \text{otherwise} \end{cases} \quad \text{Eq. (3)}$$

$$[M_A] = \begin{bmatrix} \dfrac{X_{SW}}{X_{CW}} & 0 & 0 \\ 0 & \dfrac{Y_{SW}}{X_{CW}} & 0 \\ 0 & 0 & \dfrac{Z_{SW}}{Z_{CW}} \end{bmatrix} \quad \text{Eq. (4)}$$

f(n) is a gamma function capable of transforming sRGB to linear RGB values; T is the transformation matrix; and $[M_A]$ is a chromatic adaption transformation matrix. According to Equation (1), the linear RGB values can be transformed to XYZ values (XYZ endoscope) defined the XYZ color space.

The formulas for transforming said plurality of reference image spectra 402 extracted by said spectrometer 100 to the XYZ color space are:

$$X = k \int_{380\,nm}^{780\,nm} S(\lambda)R(\lambda)\bar{x}(\lambda)d\lambda \quad \text{Eq. (5)}$$

$$Y = k \int_{380\,nm}^{780\,nm} S(\lambda)R(\lambda)\bar{y}(\lambda)d\lambda \quad \text{Eq. (6)}$$

$$Z = k \int_{380\,nm}^{780\,nm} S(\lambda)R(\lambda)\bar{z}(\lambda)d\lambda \quad \text{Eq. (7)}$$

where $$k = 100 \Big/ \int_{380\,nm}^{780\,nm} S(\lambda)\bar{y}(\lambda)d\lambda \quad \text{Eq. (8)}$$

$\bar{x}(\lambda)$, $\bar{y}(\lambda)$, $\bar{z}(\lambda)$ are color matching functions (CMF); and $S(\lambda)$ is the spectrum of the light source of the enteroscope. Since the Y value in the XYZ color space is proportional to the brightness, by using Eq. (1), the maximum brightness (the saturation brightness) of the light source can be given. Next, by limiting the upper limit of Y value to be 100, the ratio k for brightness can be acquired. By using Eq. (5) to Eq. (7), the data of said plurality of reference image spectra 402 can be transformed to XYZ values [XYZSpectrum] as defined by the XYZ color space.

Beside, by using the calibration matrix C shown in Equation (9), the images of the enteroscope can be calibrated:

$$[C] = [XYZ_{Spectrum}] \times pinv([V]) \quad \text{Eq. (9)}$$

A variable matrix [V] is given by analyzing the possible causes of error of the enteroscope. The causes include nonlinear response, dark current, inaccurate filtering of color filter, and color offset (such as white balance). Thereby, the XYZ values [XYZ Spectrum] can be calibrated.

Since the operation results for white-light images using third-order operations are approximate, the calibration for nonlinear response adopt a third-order equation, as shown in Equation (10) below:

$$V_{Non-linear} = [X^3 Y^3 Z^3 X^2 Y^2 Z^2 XYZ1]^T \quad \text{Eq. (10)}$$

In a general enteroscope, the dark current is a fixed value; it will not vary significantly with the variation of incoming light. Thereby, the influence by the dark current can be considered as a constant. The calibration variable for dark current is defined as VDark. The following Equation (11) can be used to calibrate the influence by dark current:

$$V_{Dark} = [\alpha] \quad \text{Eq. (11)}$$

The calibration variable for inaccurate filtering of color filter and color offset is defined as VColor. $\bar{x}(\lambda)$, $\bar{y}(\lambda)$, $\bar{z}(\lambda)$ are color matching functions for transforming from RGB color space to XYZ color space. According to the relation among $\bar{x}(\lambda)$, $\bar{y}(\lambda)$, $\bar{z}(\lambda)$, the combinations of X, Y, Z are listed in Equation (12) for calibrating inaccurate filtering of color filter and color offset:

$$V_{Color} = [XYZ XY XZ YZ X YZ])^T \quad \text{Eq. (12)}$$

According to Equation (10) to Equation (12), the calibrated variable matrix V can be deduced as in Equation (13) below:

$$V = \\ [X^3 Y^3 Z^3 X^2 Y X^2 Z Y^2 Z X Y^2 X Z^2 Y Z^2 XYZ X^2 Y^2 Z^2 XY \ XZ \ YZ X YZ \alpha]^T \quad \text{Eq. (13)}$$

According to the above variable matrix V and the calibration matrix C, the calibrated X, Y, Z values [XYZCorrect] can be give as in Equation (14) below:

$$[XYZ_{Correct}] = [C] \times [V] \quad \text{Eq. (14)}$$

The average error between [XYZCorrect] and [XYZSpectrum] for white-light image is 1.40.

Since the above calculations adopt the visible light band between 380 nm and 780 nm, the calibration result for enteroscope should be expressed in chromatic aberration. [XYZCorrect] and [XYZSpectrum] are transformed to the corresponding Lab color space of CIE DE2000 with the color space transformation functions shown in Equation (15) to Equation (17):

$$L^* = 116 f\left(\dfrac{Y}{Y_n}\right) - 16 \quad \text{Eq. (15)}$$

$$a^* = 500\left[f\left(\dfrac{X}{X_n}\right) - f\left(\dfrac{Y}{Y_n}\right)\right] \quad \text{Eq. (16)}$$

-continued $$b^* = 200\left[f\left(\frac{Y}{Y_n}\right) - f\left(\frac{Z}{Z_n}\right)\right] \quad \text{Eq. (17)}$$

where $$f(n) = \begin{cases} n^{\frac{1}{3}}, n > 0.008856 \\ 7.787n + 0.137931, \text{ otherwise} \end{cases} \quad \text{Eq. (18)}$$

The average chromatic aberration before calibration for the white-light image reaches 11.60. After calibration, it is lowered to 2.84.

By using the principal component analysis, the data [R_Spectrum] of said plurality of reference image spectra 402 of the 24 color checkers of said reference images 40 can be analyzed to give the principal components. Then a multiple regression analysis is performed on the corresponding principal component score and the XYZ values [XYZCorrect] of the 24 color checkers to give the transformation matrix M.

In the multiple regression analysis for the principal component score and the XYZ values [XYZCorrect], the variable V_Color is adopted. Since all combinations of X, Y, Z have been listed in the matrix VColor, after acquiring the transformation matrix M according to Equation (19), [XYZCorrect] can be used to give a plurality of simulation spectrum S_Spectrum using Equation (20):

$$[M] = [\text{Score}] \times pinv([V_{Color}]) \quad \text{Eq. (19)}$$

$$[S\text{Spectrum}]_{380\sim780\,nm} = [EV][M][V_{Color}] \quad \text{Eq. (20)}$$

Finally, the plurality of simulation spectrum $S_{Spectrum}$ of the 24 color checkers and said plurality of reference image spectra 402 $R_{Spectrum}$ of the 24 color checkers are compared and root-mean-square error (RMSE) of the color checkers is calculated. The average error of WLI is 0.057, achieving the color error not identifiable by bare eyes. If a user requires color reproduction, a superior color reproduction performance will be given. Thereby, superior hyperspectral images in visible band can be simulated.

Figure 4B:
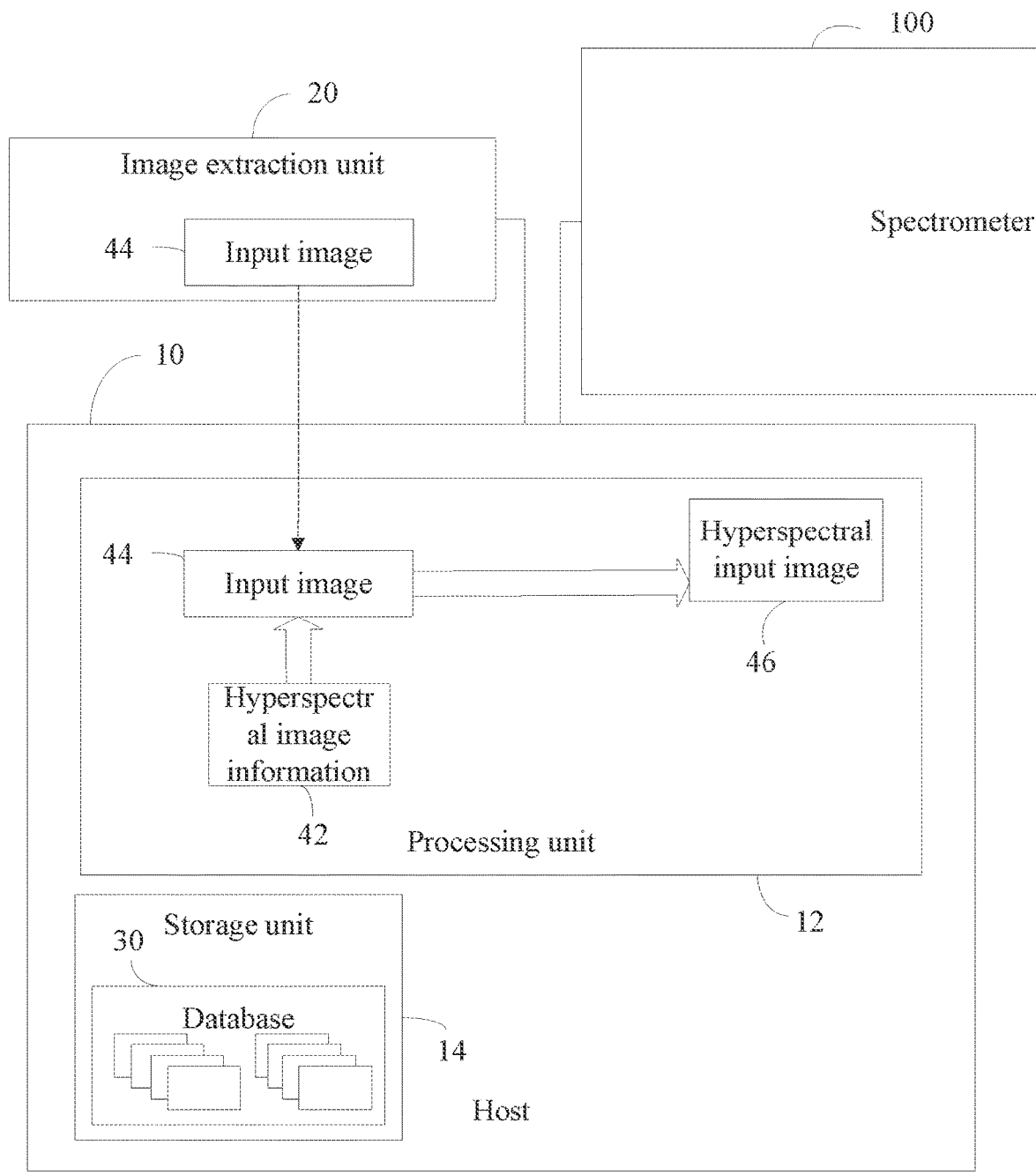

In the step S20, as shown in FIG. 4B, said host judges if said input image 44 meet the resolution threshold value for hyperspectral images, for example, 10 nm, for further executing the step S30.

In the step S30, as shown in FIG. 4B, said host 10 transforms said input image 44 according to said plurality of hyperspectral image information 42 acquired in the step S10 to produce said hyperspectral input image 46.

Figure 5:
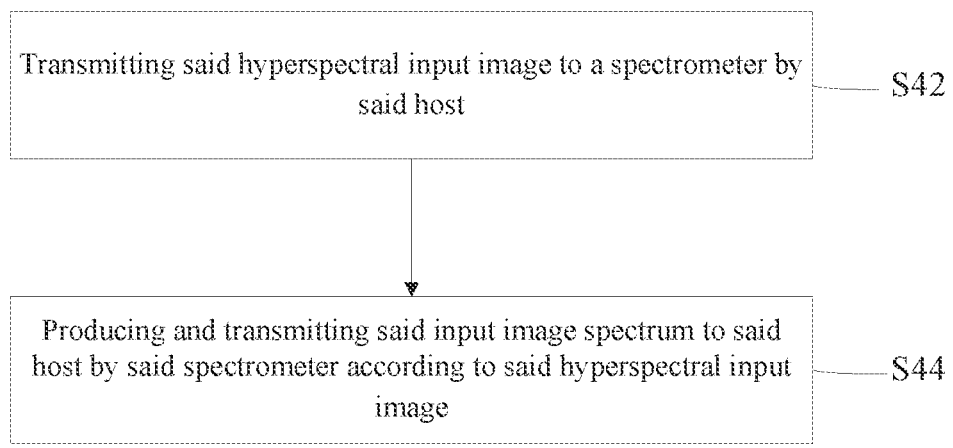
FIG. 5 shows a flowchart of the method according to an embodiment of the present invention.

In the step S40, as shown in FIG. 5, the step of said host 10 producing an input image spectrum 48 according to said hyperspectral input image 46 further includes the following steps S42, S44:

Step S42: Transmitting said hyperspectral input image to a spectrometer by said host; and Step S44: Producing and transmitting said input image spectrum to said host by said spectrometer according to said hyperspectral input image.

Figure 6A:
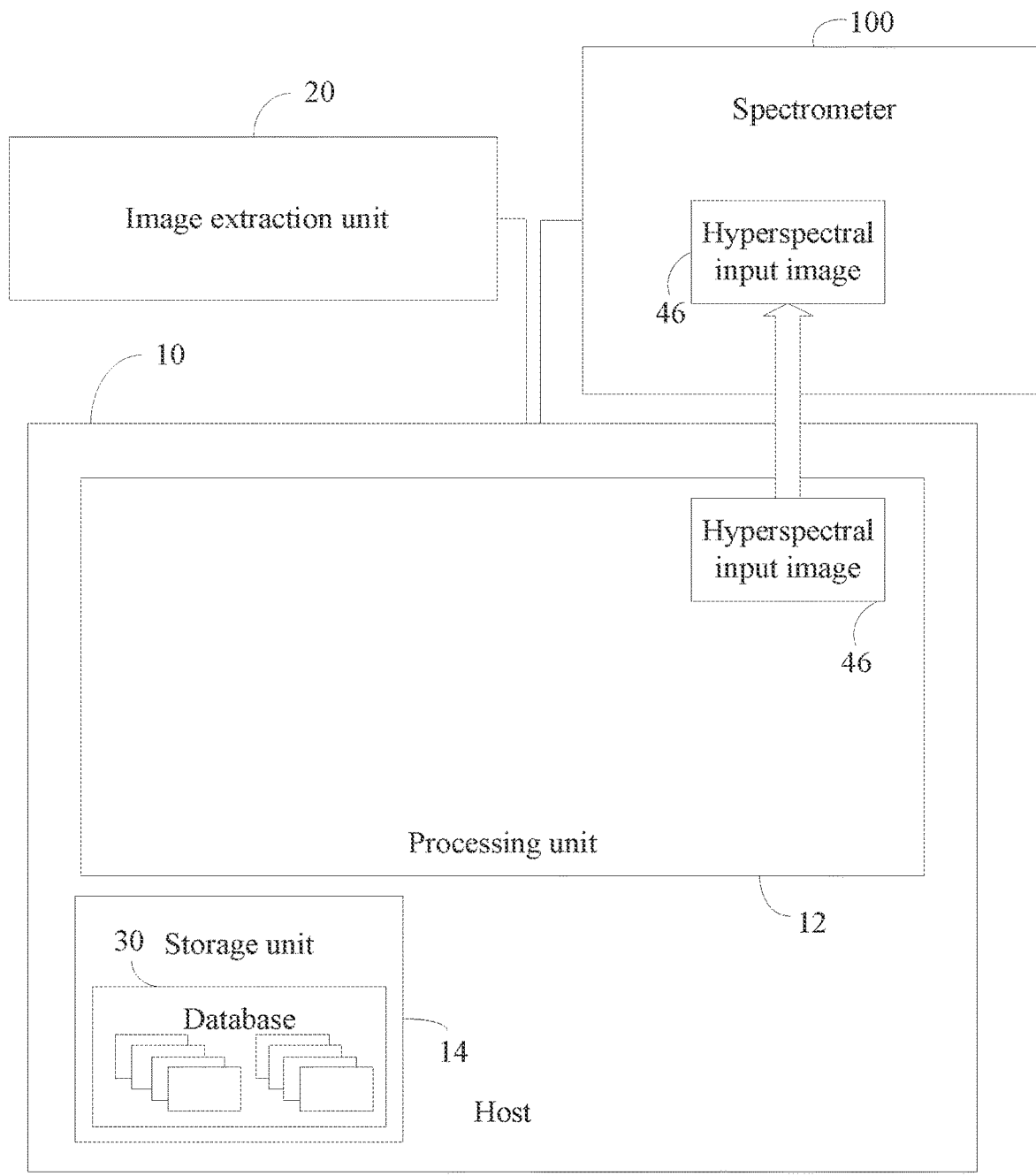
FIGS. 6A to 6C show block diagrams of the method according to an embodiment of the present invention.

In the step S42, as shown in FIG. 6A, said host 10 transmits said hyperspectral input image 46 to said spectrometer 100.

Figure 6B:
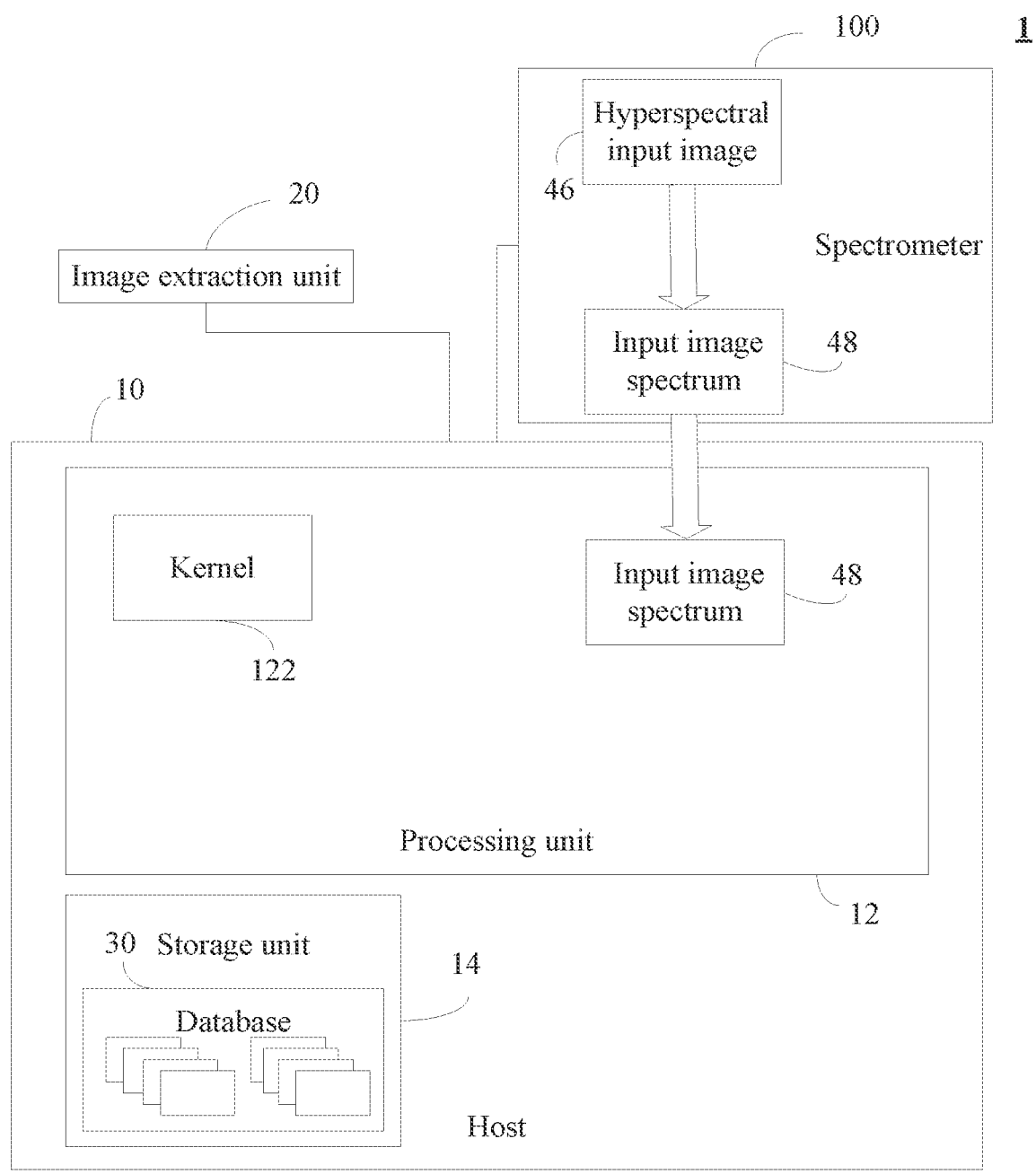

In the step S44, as shown in FIG. 6B, said spectrometer 100 transforms said hyperspectral input image 46 to an input image spectrum 48 and transmits said input image spectrum 48 to said host 10. According to the present embodiment, the spectrometer Ocean Optics-QE65000 is used to transform said hyperspectral input image 46 to said input image spectrum 48. Nonetheless, the present invention is not limited to the embodiment. Alternatively, said input image spectrum 48 can be given by using a spectrum scanning device or Fourier transformation.

Figure 6C:
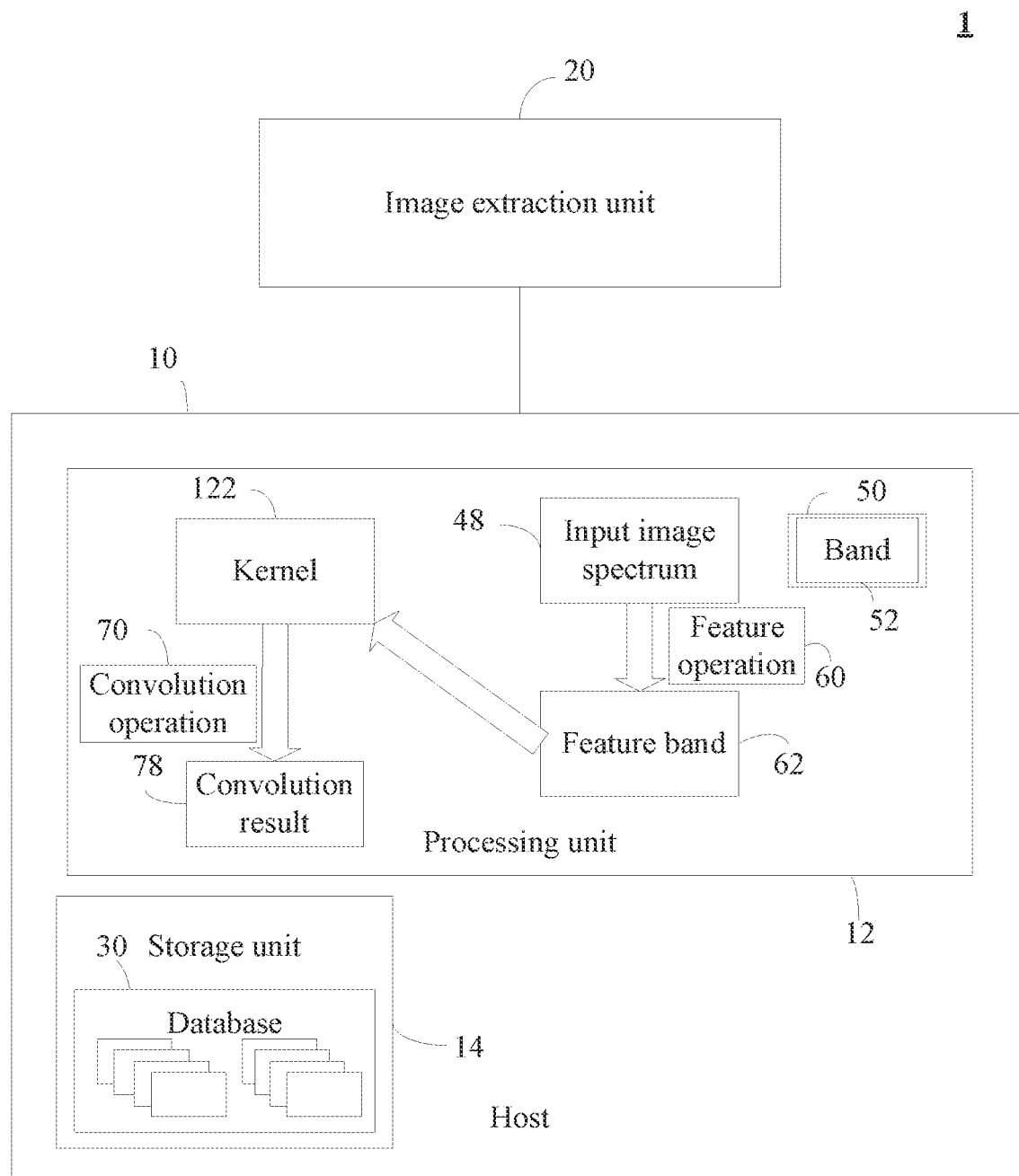

In the step S50, as shown in FIG. 6C, said host 10 performs a feature operation 60 on said input image spectrum 48 by selecting a preset cell band 52 corresponding to a surface cell of small intestine 50 for generating a plurality of corresponding feature bands 62.

Figure 7:
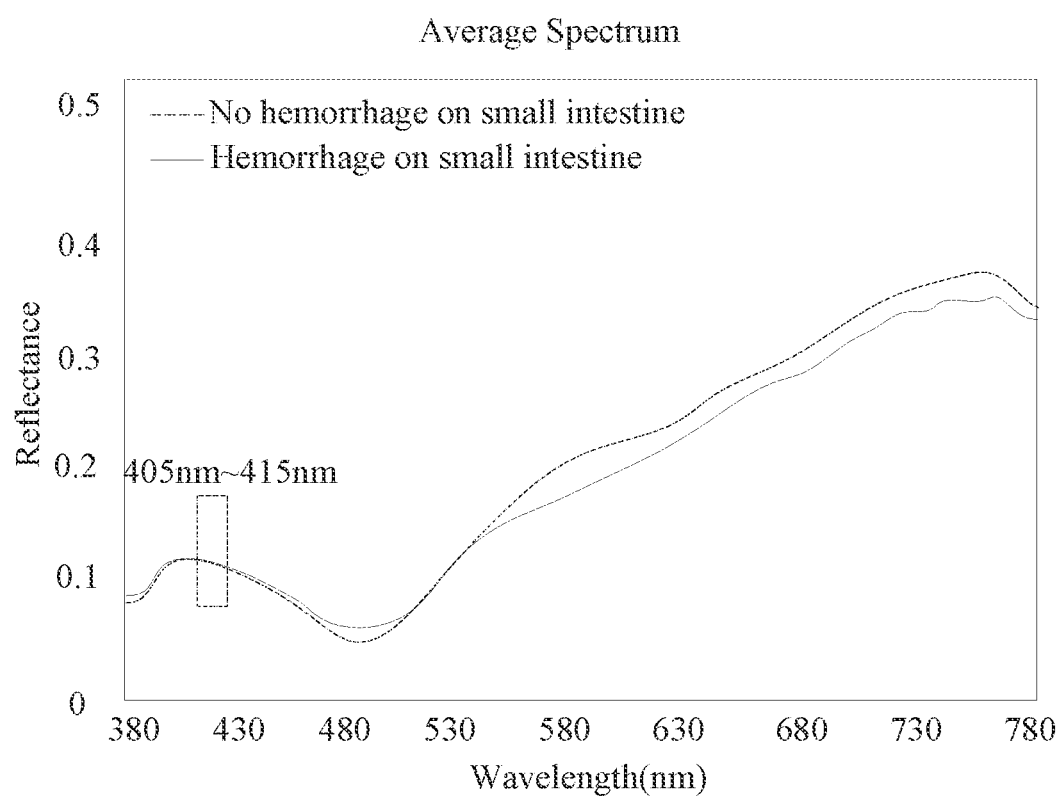
FIG. 7 shows a schematic diagram of the comparison on average spectrum generated by hyperspectral sample spectrum of hyperspectral sample images according to the present invention.

The principle of selecting a preset cell band 52 is shown in FIG. 7, which shows a schematic diagram of the comparison on average spectrum generated by hyperspectral sample spectrum of hyperspectral sample images according to the present invention. There are two curves, including a hemorrhage curve and a non-hemorrhage curve. It can be observed that the two curves differ slightly in the band 405 nm-415 nm; the curves differ apparently in the bands 535 nm-545 nm and 590 nm-620 nm; and the curves differ significantly in the band 660 nm-780 nm. According to the present invention, the band 405 nm-415 nm is selected because the images given by this band can be used to observe the capillaries in the surface mucosal tissues. The reason is that light absorptivity of hemes is maximum at 415 nm. In addition, the transmittivity of the blue light is lower than the red light and green light. The blue light will be absorbed by the surface tissues and thus highlighting the capillary tissues. Once the 535 nm-545 nm band is added, the accuracy will be reduced because intestinal villi will block other more penetrating spectra, which results in unnecessary spectra not absorbed by intestinal villi and the blue light will be mixed with the green light. Most of the images in the small intestine are small intestinal villi, and the small intestinal villi are full of villi microvessels. Most of the causes of small intestinal hemorrhage are caused by abnormal proliferation of vascular tissue, so the abnormal proliferation of vascular tissue in the small intestine occurs on the surface. The band 405 nm-415 nm is beneficial to distinguish superficial mucosal tissue lesions, so choosing the above bands will be more effective for matching and comparison.

In the step S60, as shown in FIG. 6C, said host 10 performs at least one convolution operation 70 on said plurality of feature bands 62 according to a plurality of kernels 122 for producing a convolution result 78.

Figure 8:
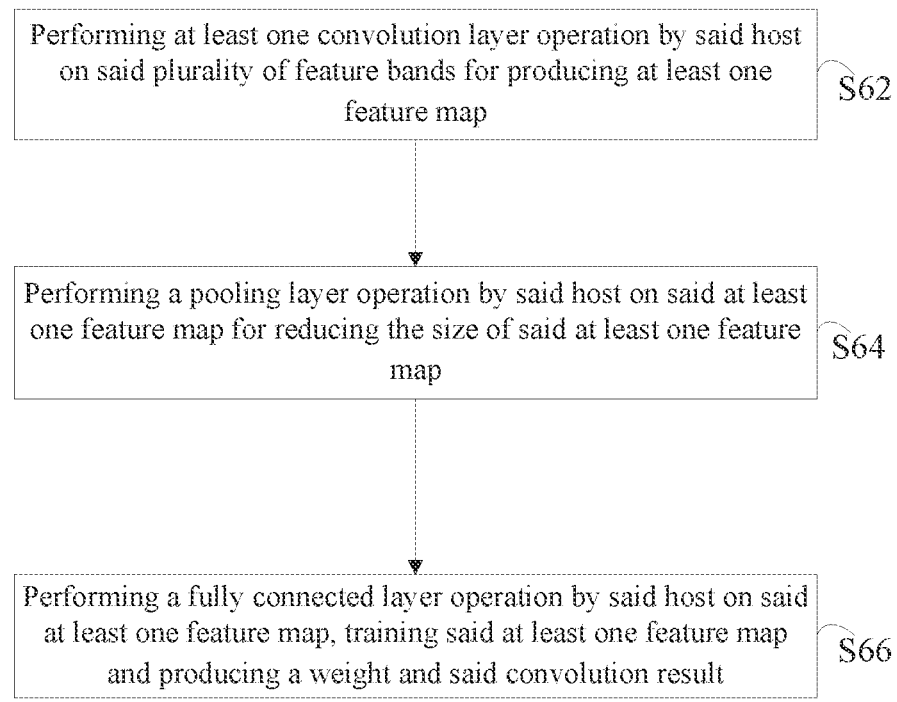
FIG. 8 shows a flowchart of the method according to an embodiment of the present invention.

The step S60 further includes steps S62, S64, and S66, as shown in FIG. 8 and illustrated as follows:

Step S62: Performing at least one convolution layer operation by said host on said plurality of feature bands for producing at least one feature map;

Step S64: Performing a pooling layer operation by said host on said at least one feature map for reducing the size of said at least one feature map; and Step S66: Performing a fully connected layer operation by said host on said at least one feature map, training said at least one feature map and producing a weight and said convolution result.

Figure 9A:
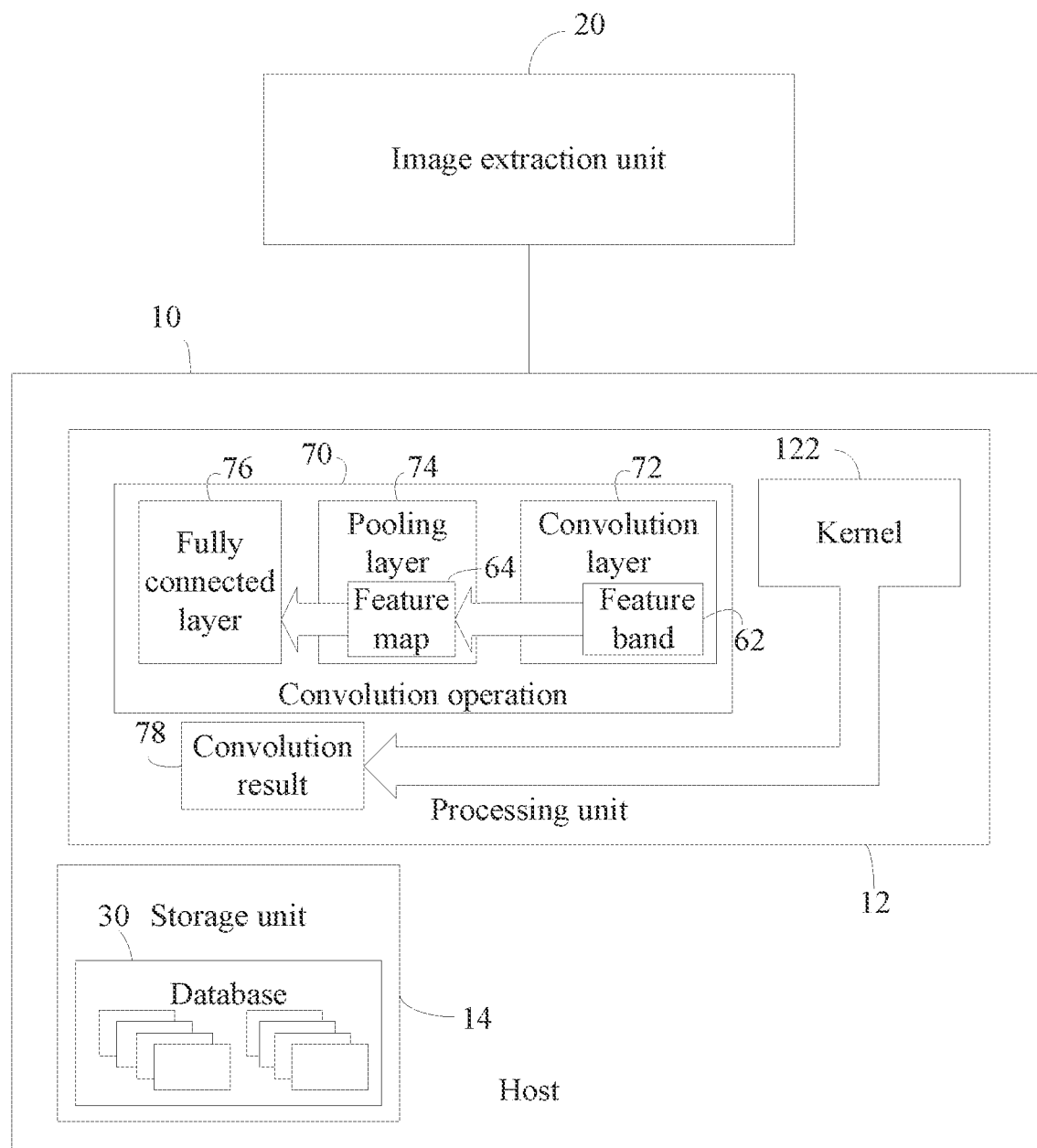
FIGS. 9A to 9B show block diagrams of the method according to an embodiment of the present invention.

In the step S62, as shown in FIG. 9A, said host 10 performs at least one convolution layer 72 operation on said plurality of feature bands 62 for producing at least one feature map 64.

In the step S64, as shown in FIG. 9A, said host 10 performs a pooling layer 74 operation on said at least one feature map 64 for reducing said size of said at least one feature map 64.

In the step S66, as shown in FIG. 9A, said host 10 performs a fully connected layer 76 operation on said at least one feature map 64 for producing said convolution result 78.

Figure 10:
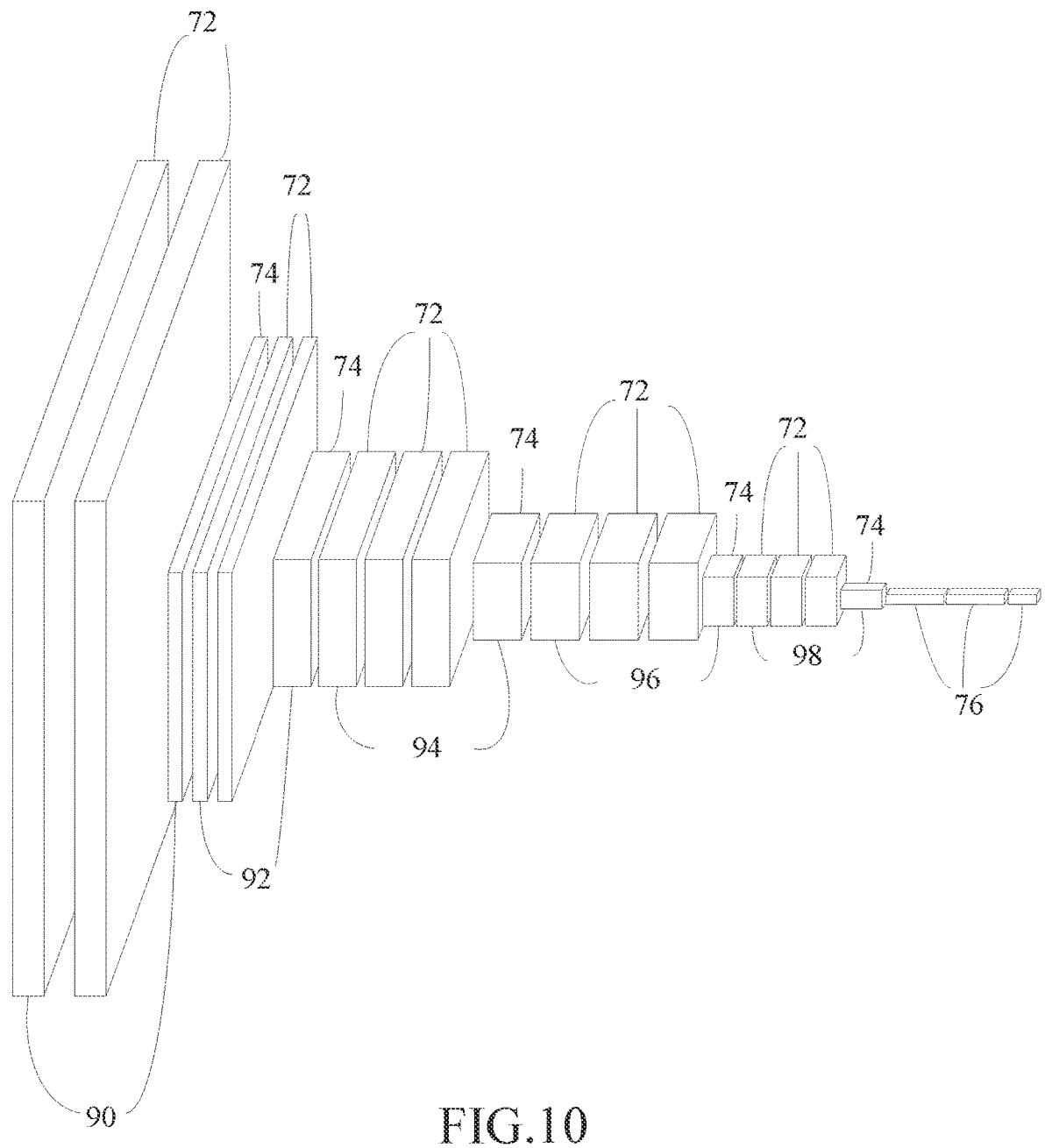
FIG. 10 shows a schematic diagram of the convolution operation according to the present invention.

Please refer to FIG. 10, which shows a schematic diagram of the convolution operation according to the present invention. As shown in the figure, said convolution operation 70 according to the present invention can be divided into a first block 90 to a fifth block 98, each of which includes at least one convolution layer 72 and a pooling layer 74. At the end, at least one fully connected layer is connected.

Figure 9B:
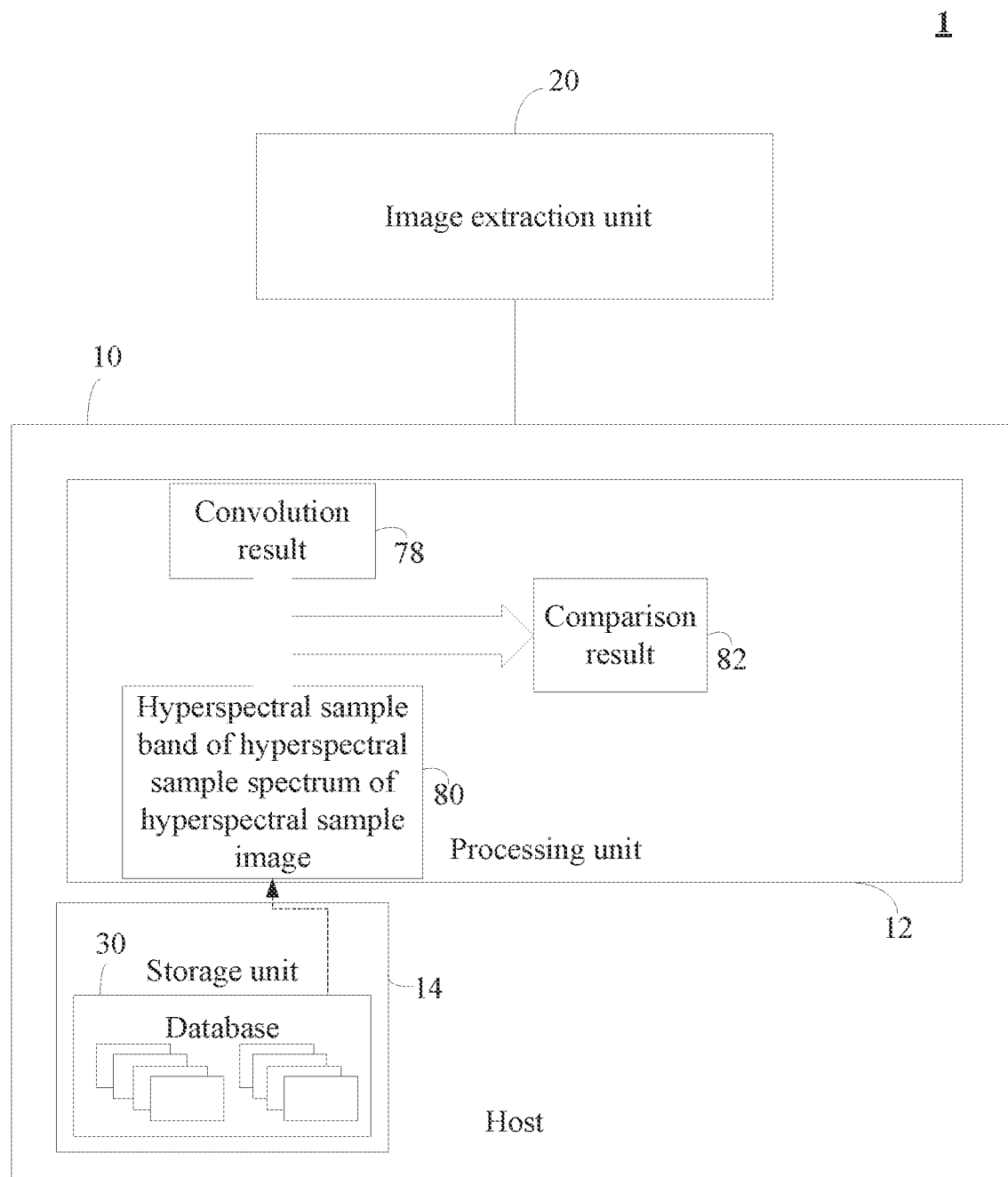

In the step S70, as shown in FIG. 9B, said host 10 matches and compares said convolution result 78 with at least one hyperspectral sample band of at least one hyperspectral sample spectrum of at least one hyperspectral sample image 80 for producing at least one comparison result 82. According to the present embodiment, said host 10 matches and compares said convolution result 78 with at least one hyperspectral sample band of at least one hyperspectral sample spectrum of at least one hyperspectral sample image 80. If said convolution result 78 matches with said hyperspectral sample band 80 of hemorrhage on said surface layer of small intestine, said hemorrhage comparison result 82 will be produced.

In the step S80, as shown in FIG. 9B, when said at least one comparison result 82 shows equality between said convolution result 78 and said hyperspectral sample band 80, said host 10 judges said input image 44 to be a hemorrhage image on said surface layer of small intestine.

An embodiment of the present invention will be illustrated in the following. Hemorrhage on said surface layer of small intestine is to be identified on a white-light image (WLI) of a capsule enteroscope. First, said host 10 performs principal component analysis on a plurality of reference images 40 for producing said hyperspectral image information 42. Next, said image extraction unit 20 extracts an input image 44 to said host 10. Said host 10 produces a hyperspectral input image 46 according to said input image 44 and said hyperspectral image information 42. Said hyperspectral input image 46 include a total of 401 bands between 380 nm and 780 nm. Thereby, select said preset cell band 52 of said surface cell of small intestine 50 to be 405 nm-415 nm for feature operation 60 and producing a plurality of feature bands 62. Then, said host 10 performs at least one layer of convolution layer operation 70 on said plurality of feature bands 62 for producing at least one feature map 64. Next, said host 10 performs a pooling layer operation 74 for reducing said size of said at least one feature map 64 and computation burden. Finally, said host 10 performs a fully connected layer 76 operation on said at least one feature map 64 for producing said convolution result 78. Said hyperspectral sample band 80 of said hyperspectral sample spectrum of said hyperspectral sample image of hemorrhage on said surface layer of small intestine stored in said database 30 is transmitted to said processing unit 12 and compared with said convolution result 78. If said convolution result 78 matches with said hyperspectral sample band 80 of said hyperspectral sample spectrum of said hyperspectral sample image of hemorrhage on said surface layer of small intestine, said input image 44 is judged to be a hemorrhage image on said surface layer of small intestine.

Thereby, enteroscopic images can be analyzed using convolution operations for judging hemorrhage on the surface layer rapidly and medical staffs can judge the current status of the small intestine of patients and providing correct medical cares. In addition, it is no longer necessary for medical staffs to view the entire film of capsule enteroscope. The burden of checking the film can be relieved significantly.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A method for detect tissue hemorrhage with image analysis, comprising steps of:
    producing a plurality of hyperspectral image information by a host according to a plurality of reference images;
    extracting an input image to said host by an image extraction unit;
    transforming said input image by said host according to said plurality of hyperspectral image information to produce a hyperspectral input image;
    producing an input image spectrum by said host according to said hyperspectral input image;
    performing a feature operation on said input image spectrum by said host according to a preset cell band corresponding to a surface cell of a small intestine for generating a plurality of corresponding feature bands;
    performing at least one convolution operation on said plurality of feature bands by said host according to a plurality of kernels for producing a convolution result;
    matching and comparing said convolution result with at least one hyperspectral sample band of at least one hyperspectral sample spectrum of at least one hyperspectral sample image by said host for producing at least one comparison result; and
    judging said input image to be a hemorrhage image on the surface layer of said small intestine when said at least one comparison result shows equality between said convolution result and said at least one hyperspectral sample band.

2. The method for detect tissue hemorrhage with image analysis of claim 1, wherein said step of producing a plurality of hyperspectral image information by a host according to a plurality of reference images includes steps of:
    producing and transmitting a plurality of reference image spectra of said plurality of reference images to said host by a spectrometer; and
    performing a principal component analysis on said plurality of reference image spectra and producing said hyperspectral image information by said host.

3. The method for detect tissue hemorrhage with image analysis of claim 1, wherein said step of performing at least one convolution operation on said plurality of feature bands by said host according to a plurality of kernels for producing a convolution result includes steps of:
    performing at least one convolution layer operation by said host on said plurality of feature bands for producing at least one feature map;
    performing a pooling layer operation by said host on said at least one feature map for reducing the size of said at least one feature map; and
    performing a fully connected layer operation by said host on said at least one feature map, training said at least one feature map and producing a weight and said convolution result.

4. The method for detect tissue hemorrhage with image analysis of claim 1, wherein said step of producing an input image spectrum by said host according to said hyperspectral input image includes steps of:

transmitting said hyperspectral input image to a spectrometer by said host; and producing and transmitting said input image spectrum to said host by said spectrometer according to said hyperspectral input image.

5. The method for detect tissue hemorrhage with image analysis of claim 1, wherein said plurality of hyperspectral image information include a plurality of white-light images corresponding to said input image, a plurality of color matching functions, a calibration matrix, and a transformation matrix.

6. The method for detect tissue hemorrhage with image analysis of claim 1, wherein said step of matching and comparing said convolution result with at least one hyperspectral sample band of at least one hyperspectral sample spectrum of at least one hyperspectral sample image by said host for producing at least one comparison result, reads said at least one hyperspectral sample band of said at least one hyperspectral sample spectrum of said at least one hyperspectral sample image from a database for matching and comparing said input image according to said convolution result by said host.

7. The method for detect tissue hemorrhage with image analysis of claim 1, wherein said at least one hyperspectral sample spectrum of said at least one hyperspectral sample image is at least one hyperspectral spectrum of the surface cell of said small intestine of at least one endoscopic hyperspectral image.

8. The method for detect tissue hemorrhage with image analysis of claim 1, wherein said at least one hyperspectral sample spectrum of said at least one hyperspectral sample image includes at least one hemorrhage spectrum of at least one hemorrhage image of the surface layer of said small intestine.

9. The method for detect tissue hemorrhage with image analysis of claim 1, wherein said feature band corresponding to said preset cell band and said at least one hyperspectral sample band is between 405 nanometers to 415 nanometers.

10. The method for detect tissue hemorrhage with image analysis of claim 1, wherein said plurality of reference images are a plurality of white-light images or a plurality of narrow-band images of a plurality of surface cells of a digestive tract.

* * * * *